(12) United States Patent
McCambridge et al.

(10) Patent No.: US 9,304,690 B2
(45) Date of Patent: Apr. 5, 2016

(54) SYSTEM AND METHOD FOR PEER-TO-PEER PCIE STORAGE TRANSFERS

(71) Applicant: HGST Netherlands B.V., Amsterdam (NL)

(72) Inventors: Colin Christopher McCambridge, Rochester, MN (US); Christopher William Barr, Rochester, MN (US); Adam Christopher Geml, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 22 days.

(21) Appl. No.: 14/272,214

(22) Filed: May 7, 2014

(65) Prior Publication Data

US 2015/0324118 A1 Nov. 12, 2015

(51) Int. Cl.
*G06F 3/06* (2006.01)
*G06F 13/40* (2006.01)

(52) U.S. Cl.
CPC .............. *G06F 3/061* (2013.01); *G06F 3/0659* (2013.01); *G06F 3/0679* (2013.01); *G06F 13/4022* (2013.01); *G06F 2206/1014* (2013.01)

(58) Field of Classification Search
CPC ..... G06F 3/061; G06F 3/0659; G06F 3/0679; G06F 13/4022; G06F 2206/1014
See application file for complete search history.

(56) References Cited

U.S. PATENT DOCUMENTS

| 8,407,377 | B1 | 3/2013 | Shapiro et al. | |
|---|---|---|---|---|
| 2008/0092148 | A1* | 4/2008 | Moertl et al. | 719/321 |
| 2012/0110259 | A1 | 5/2012 | Mills et al. | |
| 2013/0024595 | A1* | 1/2013 | Subramaniyan et al. | 710/308 |
| 2013/0086311 | A1 | 4/2013 | Huang et al. | |
| 2013/0135816 | A1 | 5/2013 | Huang | |
| 2013/0191590 | A1 | 7/2013 | Malwankar | |
| 2013/0198450 | A1 | 8/2013 | Malwankar et al. | |
| 2013/0275631 | A1* | 10/2013 | Magro et al. | 710/28 |
| 2014/0250202 | A1* | 9/2014 | Hefty et al. | 709/212 |
| 2014/0337540 | A1* | 11/2014 | Johnson et al. | 710/5 |

OTHER PUBLICATIONS

Czekalski, Marty. "How Next Generation NV Technology Affects Storage Stacks and Architectures." Flash Memory Summit, Santa Clara, CA. Aug. 2013. 22 pages.
Marks, Kevin et al. "NVM Express. The Interface Standard for PCI Express SSDs." Flash Memory Summit, Santa Clara, CA. Aug. 2011. 18 pages.

* cited by examiner

*Primary Examiner* — Eric Oberly
(74) *Attorney, Agent, or Firm* — Wilmer Cutler Pickering Hale and Dorr LLP

(57) ABSTRACT

Techniques for peer-to-peer Peripheral Component Interconnect Express (PCIe) storage transfers are disclosed. In some embodiments, the techniques may be realized as a method for providing peer-to-peer storage transfers between PCIe devices including providing, in memory of a first PCIe device, a queue for data communicated between the first PCIe device and a target PCIe device, receiving, at the first PCIe device, queue memory allocation information transmitted from a host device communicatively coupled to the first PCIe device and the target PCIe device, and generating, using a computer processor of the first PCIe device, a storage command.

19 Claims, 10 Drawing Sheets

| Parameter | Data type | Multiplicity | Required or Optional (Default Value) | Comments |
|---|---|---|---|---|
| Target Device Capabilities and Global Host System Environment | | | | |
| Target Contiguous Queues Required | Boolean | One per Target | Optional (Yes) | Optional feature could allow physically discontiguous queues. Either way works for this algorithm. |
| Target Maximum Queue Entries | Element Count | One per Target | Required | Maximum number of elements that may comprise the delegated queue. |
| Host System Memory Page Size | Byte Count | One | Required | Size of Host's System Memory Page in bytes. Required for proper creation of data buffers in Co-Host memory and proper PRP list creation. |
| Target Maximum Data Transfer Size | Memory Page Count | One per Target | Required | Maximum size of a data transfer in units of system memory pages. Sets a bound on the length of a read or write command the Co-Host may issue. |
| Target Configured CQ Entry Size | Byte Count | One per Target | Optional (16) | Size of each completion entry for this target. Could assume default of 16B for NVM Command Set. |
| Target Configured SQ Entry Size | Byte Count | One per Target | Optional (64) | Size of each submission queue entry for this target. Could assume default of 64B for NVM Command Set. |

Fig. 6

| Parameter | Data type | Multiplicity | Required or Optional (Default Value) | Comments |
|---|---|---|---|---|
| Delegated Completion Queue Parameters | | | | |
| Co-Host Completion Queue BAR Address / Offset | PCI-Express memory address (or offset) | One per Queue | Required | Location of the completion queue memory within the Co-Host's BAR space |
| Co-Host Completion Queue Size | Element Count | One per Queue | Required | Length of the completion queue within the Co-Host's BAR space. Not to exceed Target Maximum Queue Entries. |
| Co-Host Interrupt Message Address | PCI-Express memory address (or offset) | One or more | Required | Location of a message address that the Co-Host will monitor for MSI-X interrupts. Note that the mapping of delegated queues to interrupt vectors is flexible. |
| Co-Host Interrupt Message Data | DWORD | One per unique interrupt | Required | Data value that must be written to the Co-Host Interrupt Message Address to signal a specific interrupt. Flexible mapping. |
| Co-Host Completion Queue Physical Contiguity | Boolean | One per Queue | Optional (Yes) | Optional feature to allow physically discontiguous queues. |

Fig. 7

| Parameter | Data type | Multiplicity | Required or Optional (Default Value) | Comments |
|---|---|---|---|---|
| Delegated Submission Queue Parameters | | | | |
| Co-Host Submission Queue BAR Address / Offset | PCI-Express memory address (or offset) | One per Queue | Required | Location of the submission queue memory within the Co-Host's BAR space |
| Co-Host Submission Queue Size | Element Count | One per Queue | Required | Length of the submission queue within the Co-Host's BAR space. Not to exceed Target Maximum Queue Entries. |
| Co-Host Corresponding Completion Queue ID | Short | One per Queue | Required | Identifier to map completion entries from a delegated submission queue to the desired delegated completion queue. |
| Co-Host Submission Queue Priority | Priority Enum | One per Queue | Optional (Low) | Optional feature to allow Co-Host to control queue priority. |
| Co-Host Submission Queue Physical Contiguity | Boolean | One per Queue | Optional (Yes) | Optional feature to allow physically discontiguous queues. |

Fig. 8

| NVMe Command Parameter | Value for Delegation Algorithm | Effect |
|---|---|---|
| PRP Entry 1 | Co-Host Completion Queue BAR Address | Target will access Co-Host's memory for completion entries. |
| Queue Size | Co-Host Completion Queue Size | Target will know the number of queue elements in this completion queue. |
| Queue Identifier | Unique CQ Number... Value chosen by the Host to track this delegated queue. | Target will refer to this queue by this unique CQ number. |
| Interrupt Vector | Delegated IV Number... Value chosen by the host to either identify a specific MSI-X table entry which will be configured for the delegated queue, OR, to set up INTX/MSI interrupts for host-mediation. | Target will use the delegated IV number when raising interrupts. If the delegated IV number is a configured MSI-X interrupt, then the interrupt will be written directly to the Co-Host's BAR space. (See MSI-X configuration below.) |
| Interrupts Enabled | True | Target will generate interrupts when posting completion entries |
| Physically Contiguous | Co-Host Completion Queue Physical Contiguity | Optional feature to support physically discontiguous queues. |

Fig. 9

| NVMe Command Parameter | Value for Delegation Algorithm | Effect |
| --- | --- | --- |
| PRP Entry 1 | Co-Host Submission Queue BAR Address | Target will access Co-Host's memory for submission queue entries (commands). |
| Queue Size | Co-Host Submission Queue Size | Target will know the number of queue elements in this submission queue. |
| Queue Identifier | Unique SQ Number... Value chosen by the Host to track this delegated queue. | Target will refer to this queue by this unique SQ number. |
| Completion Queue Identifier | Unique CQ Number from the Create I/O Completion Queue command | Target will route completion entries for this delegated queue to the corresponding delegated Completion Queue. |
| Queue Priority | Co-Host Submission Queue Priority | Optional feature to allow Co-Host to control this submission queue's priority |
| Physically Contiguous | Co-Host Submission Queue Physical Contiguity | Optional feature to support physically discontiguous queues. |

Fig. 10

| MSI-X Table Entry Parameter | Value for Delegation Algorithm | Effect |
| --- | --- | --- |
| Message Upper Address : Message Address | Co-Host Interrupt Message Address | Target will generate Memory Writes directly to the Co-Host's BAR space when signaling an MSI-X interrupt on this vector. |
| Message Data | Co-Host Interrupt Message Data | Target will write the indicated data value to the Co-Host Interrupt Message Address when signaling an MSI-X interrupt on this vector, uniquely identifying it to the Co-Host. |

Fig. 11

SYSTEM AND METHOD FOR PEER-TO-PEER PCIE STORAGE TRANSFERS

BACKGROUND

The Non-Volatile Memory express (NVMe) Specification is a specification for accessing solid-state devices (SSDs) and other target devices attached through a Peripheral Component Interconnect Express (PCIe) bus. The Non-Volatile Memory express (NVMe) Specification defines a command interface based on a single set of administrative command and completion queues and many sets of operational Input/Output (I/O) command and completion queues. Administrative queues are used for tasks such as queue creation and deletion, device status interrogation and feature configuration, while I/O queues are used for all storage-related transfers, such as block reads and writes. However, the NVMe specification relies on the host resources for command and control to a degree which can present a bottleneck or chokepoint in system performance.

According to the NVMe specification, only a system's host CPU is capable of sending storage commands to an NVMe Controller. Additionally PCI-Express system architecture faces two typical performance constraints. First, typical PCI-Express fabrics with high device fan-out (such as an enterprise storage backplane) have lower total upstream bandwidth (from a PCI-Express Switch upstream to the host) than downstream bandwidth (from the same PCI-Express Switch downstream to all connected storage controllers). This represents bandwidth overprovisioning downstream of the switch, which cannot be fully utilized when the only permitted traffic flows between host and endpoint NVMe Controller. Second, in a system that only permits the host to generate storage traffic to all controllers, the host's resources (especially computation power/CPU and storage/Dynamic Random-Access Memory (DRAM)) are a bottleneck to overall system performance. The overall latency and throughput of the system are bound by the capabilities of the host. The latency problem is especially detrimental for applications like a High Performance Compute platform, where a computation device such as a graphics processing unit (GPU) desires access to a large quantity of data on a storage medium, but cannot access it without the host acting as an intermediary to initiate the storage transfers from the drive to host DRAM and then further memory transfers from host DRAM down to the GPU.

Earlier attempts at resolving such issues include vendor-unique and proprietary solutions that do not resolve the problem of accessing an off-the-shelf NVM Controller. However, this does not enable devices not compatible with such vendor-unique or proprietary solutions to generate such traffic, and further is not compatible with the NVM Express protocol, since NVM Express only allows the system host to generate traffic.

In view of the foregoing, it may be understood that there may be significant problems and shortcomings associated with current technologies for peer-to-peer PCIe storage transfers.

SUMMARY OF THE DISCLOSURE

Techniques for peer-to-peer PCIe storage transfers are disclosed. In some embodiments, the techniques may be realized as a method for providing peer-to-peer storage transfers between Peripheral Component Interconnect Express (PCIe) devices including providing, in memory of a first PCIe device, a queue for data communicated between the first PCIe device and a target PCIe device, receiving, at the first PCIe device, queue memory allocation information transmitted from a host device communicatively coupled to the first PCIe device and the target PCIe device, and generating, using a computer processor of the first PCIe device, a storage command.

In accordance with additional aspects of this exemplary embodiment, the peer-to-peer storage transfers may include storage transfers to or from an Non-Volatile Memory express (NVMe) compliant target device.

In accordance with further aspects of this exemplary embodiment, the queue can be assigned to a Peripheral Component Interconnect Express (PCIe) memory region assigned by a PCIe enumerator at initialization time of the first PCIe device.

In accordance with additional aspects of this exemplary embodiment, the queue may be an I/O (Input/Output) submission queue for communication of a storage command to the target PCIe device.

In accordance with further aspects of this exemplary embodiment, the queue may be an I/O (Input/Output) completion queue for receiving an indication of storage command completion from the target PCIe device.

In accordance with additional aspects of this exemplary embodiment, the techniques may further include providing, in memory of the first PCIe device, a second queue for data communicated between the first PCIe device and the target PCIe device, and receiving, at the first PCIe device, queue memory allocation information from the host device for the second queue.

In accordance with additional aspects of this exemplary embodiment, the second queue may include at least one of: an I/O (Input/Output) submission queue for communication of a storage command to the target PCIe device and an I/O (Input/Output) completion queue for receiving an indication of storage command completion from the target PCIe device.

In accordance with further aspects of this exemplary embodiment, the techniques may further include providing, in memory of the first PCIe device, a data buffer.

In accordance with additional aspects of this exemplary embodiment, a queue may be provided in memory of the host device for at least one of: admin submission, admin completion, I/O submission, and I/O completion.

In accordance with other aspects of this exemplary embodiment, the techniques may further include providing, in memory of the host device, a data buffer.

In accordance with further aspects of this exemplary embodiment, the techniques may further include a determination of a number of queues to utilize on the first PCIe device and a number of queues to utilize on the host device based on one or more factors including: an amount of memory available on the first PCIe device, an amount of memory available on the host device, a utilization level of the host device, a utilization level of the first PCIe device, an amount of bandwidth available between a Peripheral Component Interconnect Express (PCIe) switch and the host device, an amount of bandwidth available between the Peripheral Component Interconnect Express (PCIe) switch and the first PCIe device, and an amount of bandwidth available between a Peripheral Component Interconnect Express (PCIe) switch and the target PCIe device.

In accordance with other aspects of this exemplary embodiment, the techniques may further include providing, in memory of a third PCIe device, a second queue for data communicated between the first PCIe device and the target PCIe device, and receiving, at the first PCIe device, queue memory allocation information from the host device for the second queue.

In accordance with additional aspects of this exemplary embodiment, the techniques may further include initiating by the first PCIe device a storage transfer command by storing the generated storage transfer command in an I/O submission queue, issuing a peer-to-peer memory write to a doorbell register of the target PCIe device, receiving at the first PCIe device a memory read command from the target PCIe device to fetch the storage transfer command, and transferring data between the first PCIe device and the target PCIe device.

In accordance with additional aspects of this exemplary embodiment, the techniques may further include receiving an indication of completion written by the target PCIe device in an I/O completion queue, receiving an interrupt from the target PCIe device, fetching, by the first PCIe device, the completion from the I/O completion queue; and updating a doorbell of the target PCIe device.

In accordance with further aspects of this exemplary embodiment, the target PCIe device can be MSI-X (Message Signaled Interrupts eXtended) compliant and the interrupt can be sent from the target PCIe device to an address in memory of the first PCIe device (e.g., an address in a PCIe memory map such as PCIe Bar space on a first PCIe device). In some embodiments, memory may not be required in a first PCIe device for an interrupt and hardware processing logic may be triggered from a PCIe Memory Write Transaction Layer Packet (TLP) of the MSI-X interrupt.

In accordance with other aspects of this exemplary embodiment, the target PCIe device may not be MSI-X (Message Signaled Interrupts eXtended) compliant and the interrupt may be sent from the target PCIe device to the host and wherein the host relays the interrupt to an address in memory of the first PCIe device (e.g., an address in a PCIe memory map such as PCIe Bar space on a first PCIe device). In some embodiments, memory may not be required in a first PCIe device for an interrupt and hardware processing logic may be triggered from a PCIe Memory Write Transaction Layer Packet (TLP) of the MSI-X interrupt.

In accordance with additional aspects of this exemplary embodiment, the host device may include at least one of: an enterprise server, a database server, a workstation, and a computer.

In accordance with additional aspects of this exemplary embodiment, the target PCIe device may include at least one of: a graphics processing unit, an audio/video capture card, a hard disk, a host bus adapter, and a Non-Volatile Memory express (NVMe) controller. According to some embodiments, the target device may be an NVMe compliant device.

In some embodiments, the techniques for peer-to-peer PCIe storage transfers may be realized as a computer program product comprised of a series of instructions executable on a computer, the computer program product performing a process for peer-to-peer Peripheral Component Interconnect Express (PCIe) storage transfers. The computer program may implement the steps of providing, in memory of a first PCIe device, a queue for data communicated between the first PCIe device and a target PCIe device, receiving, at the first PCIe device, queue memory allocation information transmitted from a host device communicatively coupled to the first PCIe device and the target PCIe device, and generating, using a computer processor of the first PCIe device, a storage command.

In some embodiments, the techniques for peer-to-peer PCIe storage transfers may be realized as a system for peer-to-peer Peripheral Component Interconnect Express (PCIe) storage transfers. The system may include a host device, a first Peripheral Component Interconnect Express (PCIe) device, a target Peripheral Component Interconnect Express (PCIe) device, and a Peripheral Component Interconnect Express (PCIe) switch communicatively coupling the first PCIe device, the target PCIe device, and the host. In some embodiments, PCIe root complex functionality or PCIe fabric may provide connectivity instead of a PCIe switch. The first PCIe device can include stored Non-Volatile Memory express (NVMe) command submission instructions stored in memory, the instructions including an address of a queue in memory of the first PCIe device for I/O submission, and instructions for generating an NVMe command.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 6 depicts a table of exemplary parameters for communicating device capabilities between a host and a co-host, in accordance with an embodiment of the present disclosure.

FIG. 7 depicts a table of exemplary completion queue parameters, in accordance with an embodiment of the present disclosure.

FIG. 8 depicts a table of exemplary submission queue parameters, in accordance with an embodiment of the present disclosure.

FIG. 9 depicts a table of exemplary completion queue creation parameters, in accordance with an embodiment of the present disclosure.

FIG. 10 depicts a table of exemplary submission queue creation parameters, in accordance with an embodiment of the present disclosure.

FIG. 11 depicts a table of exemplary interrupt vector configuration parameters, in accordance with an embodiment of the present disclosure.

DESCRIPTION

The present disclosure relates to peer-to-peer PCIe storage transfer. According to the NVMe specification, only a system's host CPU is capable of sending storage commands to an NVMe Controller. Embodiments of the present disclosure provide systems and methods by which a system host may delegate part of its authority to a PCI Express device (i.e., a co-host) such that the co-host can autonomously send storage commands to the NVMe controller. According to some embodiments, storage commands can be sent to the NVMe controller with limited host interaction or without further host interaction. This addresses two typical performance constraints of a PCI-Express system architecture, enabling higher performance across many metrics. First, typical PCI-Express fabrics with high device fan-out (such as an enterprise storage backplane) have lower total upstream bandwidth (from a PCI-Express Switch upstream to the host) than downstream bandwidth (from the same PCI-Express Switch downstream to all connected storage controllers). This represents bandwidth overprovisioning downstream of the switch, which cannot be fully utilized when the only permitted traffic flows between host and endpoint NVMe Controller. Second, in a system that only permits the host to generate storage traffic to all controllers, the host's resources (especially computation power/CPU and storage/Dynamic Random-Access Memory (DRAM)) can be a bottleneck to overall system performance. The overall latency and throughput of the system are bound by the capabilities of the host. Embodiments of the present disclosure, can permit peer-to-peer traffic among the devices downstream of the switch, and can allow fuller utilization of bandwidth overprovisioning downstream of the switch, which can dramatically increase overall system performance in a variety of applications.

Embodiments of the disclosure reduce or eliminate involvement of a host in PCIe peer-to-peer storage transfers, and allow a device such as, for example, a GPU to directly invoke storage transfers from the NVM Controller to itself over the shared PCI Express fabric.

Potential applications may include, for example, self-assembling storage arrays, peer-to-peer High Performance Compute applications, peer accelerated caching, and peer accelerated defragmentation. Peer-to-peer PCIe storage transfers techniques are discussed in further detail below.

Figure 1:
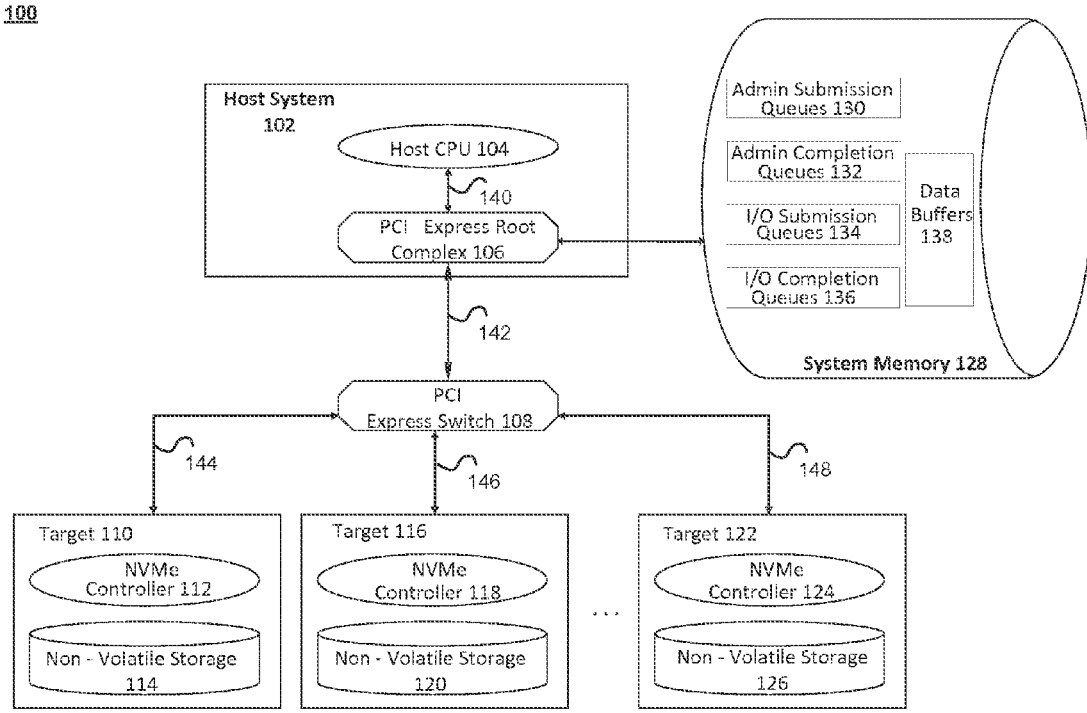
FIG. 1 shows an exemplary block diagram depicting a plurality of PCIe devices in communication with a host device, in accordance with an embodiment of the present disclosure.

Turning now to the drawings, FIG. 1 is an exemplary block diagram depicting a PCIe device in communication with a host device, in accordance with an embodiment of the present disclosure. FIG. 1 includes a number of computing technologies such as a host system 102, host CPU 104, and PCI express root complex 106. PCI express switch 108 may communicatively couple a plurality of targets (e.g., PCIe devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126.

System memory 128 may contain memory based resources accessible to Host System 102 via a memory interface (e.g., double data rate type three synchronous dynamic random access memory (DDR3 SDRAM)). System memory 128 can take any suitable form, such as, but not limited to, a solid-state memory (e.g., flash memory, or solid state device (SSD)), optical memory, and magnetic memory. System memory 128 can be volatile or non-volatile memory. As illustrated in FIG. 1, system memory 128 may contain one or more data structures such as, for example, admin submission queues 130, admin completion queues 132, I/O submission queues 134, I/O completion queues 136, and data buffers 138.

Connection 140 between PCI express root complex 106 and host CPU 104 may be a high-bandwidth interconnect such as, for example, Intel QuickPath Interconnect (QPI). Connection 142 between PCI express root complex 106 and PCI express switch 108 may have limited bandwidth (e.g., a PCI-Express based interface providing 32 lanes). Connections 144, 146, and 148 may be also have limited bandwidth (e.g., PCI-Express based interfaces providing 8 lanes each). While only connections 144, 146, and 148 are illustrated it may be appreciated that a number of targets connected to PCI express switch 108 may be less or significantly more (e.g., 96 devices). As the number of targets connected to PCI express switch 108 increases the bandwidth at connection 142 may become a chokepoint.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

The NVMe Specification defines a command interface based on a single set of Administrative Command and Completion Queues (e.g., admin submission queues 130 and admin completion queues 132) and many sets of Operational I/O Command and Completion Queues (e.g., I/O submission queues 134, I/O completion queues 136). Administrative queues are used for tasks such as queue creation and deletion, device status interrogation and feature configuration, while I/O queues are used for all storage-related transfers, such as block reads and writes.

The NVMe Specification is designed such that a single host controls and manages all of these resources. As described in further detail below with reference to FIG. 2, embodiments of the disclosure provide systems and methods in which one or more sets of I/O queues can instead be owned by another solid state device connected to a host (e.g., a PCIe device). This may keep a large portion of storage network traffic off of a host and below a chokepoint (e.g., a connection between a PCIe switch and a host). Additionally, embodiments of the disclosure may provide an ability for another solid state device other than the host (e.g., a PCIe device) to instantiate, process, and/or receive one or more storage related commands. Such instantiation, processing, and/or reception of commands may reduce CPU utilization of a host even if queues in system memory are being accessed.

Figure 2:
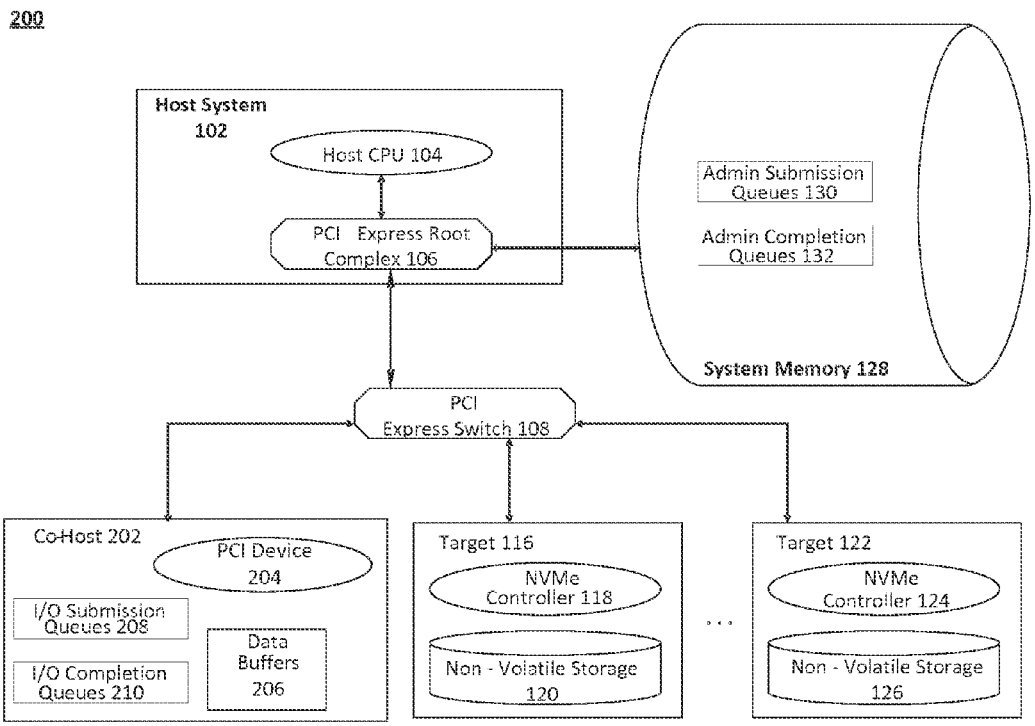
FIG. 2 shows an exemplary block diagram depicting a plurality of PCIe devices in communication with a host device, in accordance with an embodiment of the present disclosure.

FIG. 2 shows an exemplary block diagram depicting a plurality of PCIe devices in communication with a host device, in accordance with an embodiment of the present disclosure. As illustrated in FIG. 2, the components host system 102, PCI express switch 108, Target 116, and Target 122 are as described in reference to FIG. 1 above. Admin Submission Queues 130 and Admin Completion Queues also remain as described in reference to FIG. 1 above. As illustrated in FIG. 2, Co-Host 202 may be a solid state device (e.g., a PCIe device) having PCIe device 204 as well as I/O submission queues 208, I/O completion queues 210, and data buffers 206.

As illustrated the movement of one or more data structures such as, for example, I/O queues, may allow more storage traffic (e.g., NVM traffic) to remain below PCI express switch 108 and off of host system 102. As illustrated in FIG. 2, co-host 202 may be delegated one or more storage management commands and/or data structures which may allow it autonomously generate NVM traffic to a separate NVM Express Controller connected to the same PCI Express fabric in a peer-to-peer fashion. This may allow peer-to-peer storage transfers between co-host 202 (e.g., a PCI-Express device) desiring to generate the traffic and an off-the-shelf NVMe Controller (e.g., Target 116 and Target 122) that adheres to the NVMe specification. Co-host 202 can be any PCI-Express device generating traffic for any purpose, such as a Graphics Processing Unit, an Audio/Video Capture card, another NVMe Storage Controller, or any other PCI-Express-attached device. According to some embodiments providing autonomous peer-to-peer storage transfers may be accomplished by queue delegation and by mapping that delegation onto existing PCI Express protocol primitives.

As discussed above, the NVMe Specification defines a command interface based on a single set of administrative command and completion queues and many sets of operational I/O command and completion queues. Administrative queues are used for tasks such as queue creation and deletion, device status interrogation and feature configuration, while I/O queues are used for all storage-related transfers, such as block reads and writes. The NVMe Specification is designed such that a single host controls and manages all of these resources. As illustrated in FIG. 2, one or more sets of I/O queues can instead be owned by co-host 202 (e.g., a PCI Express device). Co-host 202 may use these I/O queues (e.g., I/O submission queues 208 and I/O completion queues 210) to autonomously generate NVM traffic to a given NVM Controller (e.g., target 116 and target 122). According to some embodiments, host system 102 may create an I/O queue in memory of co-host 202. The backing storage for such queues can be a range of memory within an allocated BAR space of co-host 202. BAR spaces are PCI Express memory regions assigned by the PCI enumerator at device initialization time, and are accessible to all devices on a PCI Express fabric. I/O queues on co-host 202 can use the ordinary doorbell addresses within a Target's BAR space (e.g., memory addresses in BAR space of Target 116 and/or Target 122), and can be assigned an MSI-X interrupt address that is again within an allocated BAR space of co-host 202. After queue creation, host system 102 can communicate memory allocation details to co-host 202. Co-host 202 may then execute commands autonomously of host system 102 using the normal NVMe protocol. According to some embodiments, the queue memory allocation information can be determined by the co-host 202 and transmitted from co-host 202 to host system 102.

The memory allocations of queues may be carefully chosen parameters that map one or more queuing operations to resources actually controlled by co-host 202. Specifically, a queue requires storage to hold the queue entries, a 'doorbell' BAR address on the Target to notify the Target that new entries are available in a submission queue or have been consumed from a completion queue, and an Interrupt vector for the Target to notify the queue owner when new entries have been added by the Target to a completion queue. Finally, the actual command represented in the queue may require some storage to transfer to/from to perform the command operation.

To submit a command in this instantiation, co-host 202 may fill in a submission entry in memory for an I/O submission queue 208 (e.g., in BAR memory). After submitting an entry in I/O submission queue 208, co-host 202 may issue a peer-to-peer memory write to update a target's doorbell register for that queue. For example, if co-host 202 instantiates a storage command for target 116, co-host 202 may update a memory address of Target 116 (e.g., in BAR space), which was provided to co-host 202 by host system 102. Co-host 202 may then wait for command completion. Target 116 may detect the doorbell write and may fetch the command from co-host 202's I/O submission queues 208 by issuing an appropriate Memory Read, and may process the command. As illustrated in FIG. 2, I/O submission queues 208 are in memory of co-host 202. According to some embodiments, I/O submission queues may remain in system memory 128 or may be in another location such as, for example, in memory space of another solid state device (e.g., a PCIe device connected to the same PCI Express fabric). Location of queues or other data structures such as data buffers may be dependent upon one or more factors including, but not limited to, an amount of memory available on the co-host, an amount of memory available on the host device, a utilization level of the host device, a utilization level of the co-host, an amount of bandwidth available between a Peripheral Component Interconnect Express (PCIe) switch and the host device, and an amount of bandwidth available between the Peripheral Component Interconnect Express (PCIe) switch and the co-host. In embodiments where a queue or other data structure remains in memory associated with the host (e.g., system memory 128) performance gains may still be realized by delegating commands to a co-host and decreasing host CPU utilization.

Upon completion of a command, a Target (e.g., target 116) will issue a Memory Write to fill out a Completion Entry in an I/O completion queue (e.g., I/O completion queues 210). A target may then issue a Memory Write to signal completion. For targets that are Message Signaled Interrupts eXtended (MSI-x) compliant the target may write to a configured MSI-X interrupt with co-host 202's memory. Since the address of the interrupt is also within the co-host's BAR space, the Memory Write can be routed directly to the co-host by PCI express switch 108, rather than to host system 102.

If a Target does not support MSI-X interrupt schemes, host system 102 could be used to relay legacy (polled, INTX or MSI) interrupts from a Target to co-host 202 as appropriate. This may add Host CPU 104 contention as a performance limit, but may allow increased bandwidth via peer-to-peer data transfers. During the configuration process, host system 102 can be aware that a Target does not support MSI-X interrupts and can prepare itself to mediate the available interrupt scheme on behalf of co-host 202. Co-host 202 may be made aware of the mediation, but this is not necessary. When host system 102 is relaying interrupts for co-host 202, host system 102 may decode an interrupt as per the ordinary NVMe scheme. Using the decoded information, host system 102 can determine that the interrupt may have been sent on behalf of the delegated queue which is owned by co-host 202. In some embodiments, due to interrupts shared among multiple queues causing decoding ambiguity, host system 102 may make the conservative decision to notify co-host 202 even though there may not yet be work for the co-host to do. This is a compatibility option and other configurations may be used for performance scenarios. After notification, co-host 202 now knows that the completion entry is available and may read it from the completion queue at its leisure.

To further reduce dependence on external devices, a co-host may use more allocated memory space (e.g., BAR space) to store data buffers (e.g., data buffers 206) which may contain a command, scatter-gather lists, or Physical Region Pages (PRPs) for processing a command. Scatter-gather lists and Physical Region Pages (PRPs) may describe memory locations of additional data buffers (which may or may not be in a same memory area as the scatter-gather lists or Physical Region Pages (PRPs)). In these embodiments, a Target may issue Memory Reads and writes that are directly routed to co-host 202 instead of the host system 102.

Application of these techniques may permit PCI-Express devices or storage subsystems to realize significant performance gains. Embodiments can be leveraged for many applications above and beyond merely storing and retrieving data such as, for example, to accelerate High Performance Compute platforms or enable real-time capture of high-bandwidth streaming media.

Embodiments may use the NVM protocol in an unmodified form (i.e., any system may share off-the-shelf NVM drive components between host and co-host).

Figure 3:
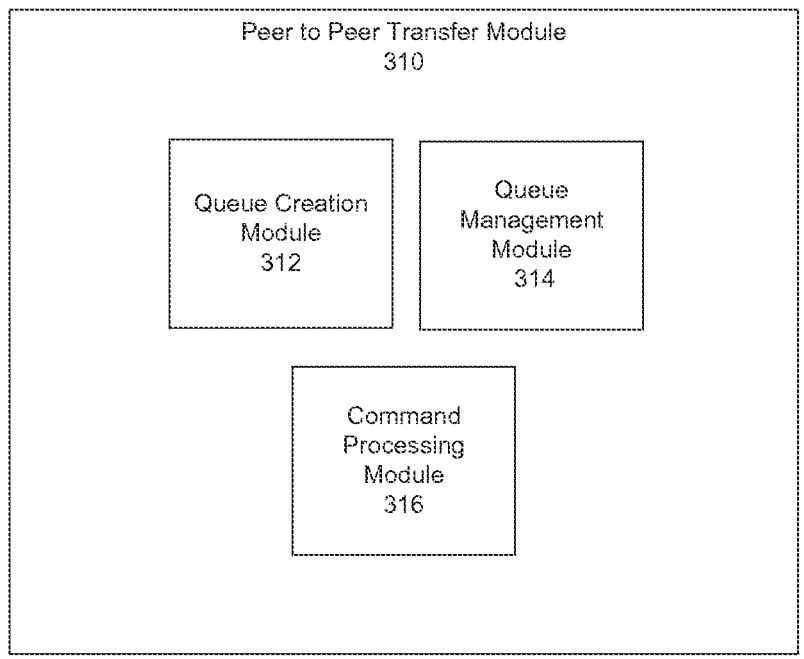
FIG. 3 depicts an exemplary module for peer-to-peer PCIe storage transfers, in accordance with an embodiment of the present disclosure.

FIG. 3 depicts an exemplary module for peer-to-peer PCIe storage transfers, in accordance with an embodiment of the present disclosure. As illustrated in FIG. 3, Peer to Peer Transfer Module 310 may contain Queue creation module 312, Queue management module 314, and command processing module 316.

Queue creation module 312 may, in some embodiments, reside on a host or on storage media associated with a host and may contain logic for the creation and deletion of queues. This may include identifying and allocating memory space (e.g., in system memory associated with a host, in BAR space of a co-host, in other memory space associated with a co-host, or in memory space associated with a solid state device such as a PCIe device communicatively coupled to a co-host).

Queue management module 314 may, in some embodiments reside on a co-host or on storage media associated with a co-host and may contain instructions for processing commands. Queue management module 314 may also store one or more memory locations provided by a host associated with queues, doorbells, interrupts, data buffers, or other data structures.

Command processing module 316 may, in some embodiments reside on a co-host or on storage media associated with a co-host and may contain instructions for generating commands.

Figure 4:
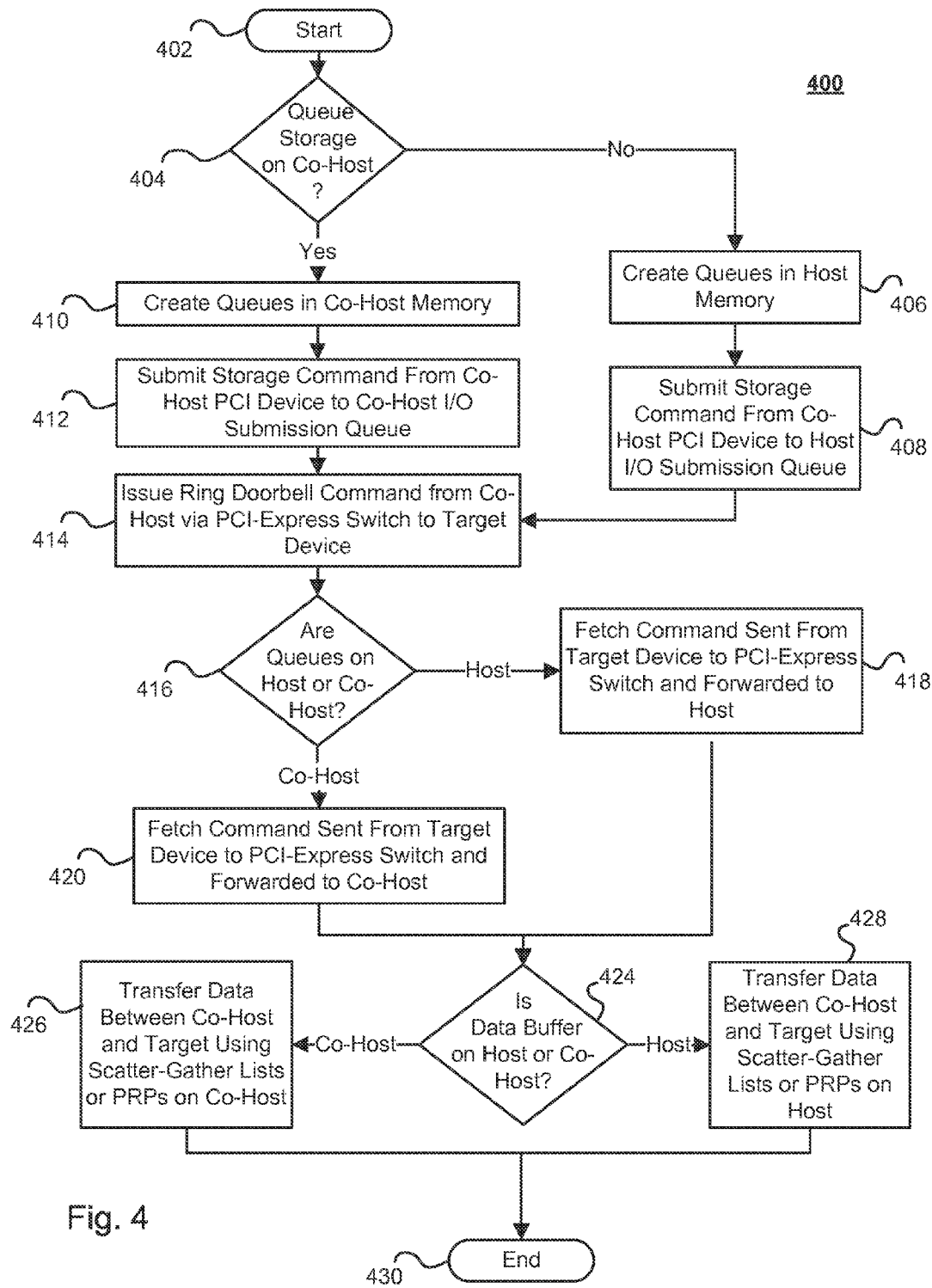
FIG. 4 depicts a flowchart illustrating peer-to-peer PCIe storage transfers, in accordance with an embodiment of the present disclosure.

FIG. 4 depicts a flowchart illustrating peer-to-peer PCIe storage transfers, in accordance with an embodiment of the present disclosure. The process 400, however, is exemplary only. The process 400 can be altered, e.g., by having stages added, changed, removed, or rearranged. At stage 402, the process may begin.

At stage 404, it may be determined whether a queue storage is to be on a co-host or another location. In some embodiments, queues may be allocated on a separate PCIe device. Location of queues or other data structures such as data buffers may be dependent upon one or more factors including, but not limited to, an amount of memory available on the co-host, an amount of memory available on the host device, a utilization level of the host device, a utilization level of the co-host, an amount of bandwidth available between a Peripheral Component Interconnect Express (PCIe) switch and the host device, and an amount of bandwidth available between the Peripheral Component Interconnect Express (PCIe) switch and the co-host. In embodiments where a queue or other data structure remains in memory associated with the host (e.g., system memory 128) performance gains may still be realized by delegating commands to a co-host and decreasing host CPU utilization. If a queue is to be created on a co-host, the method may continue at stage 410. If a queue is to be created on a host, the method may continue at stage 406.

At stage 406, queues (e.g., I/O submission queues and I/O completion queues) may be created in system memory associated with a host (e.g., system memory 128 of FIG. 1). According to some embodiments, a host may create queues and may provide memory allocation details to a co-host. According to one or more embodiments, a co-host determine memory allocation information and provide the memory allocation information to a host.

At stage 408 a storage command may be submitted from a co-host to a host I/O submission queue. Such a submission may not reduce bandwidth chokepoints occurring above a PCIe Express switch, but may still reduce host CPU utilization.

At stage 410, queues (e.g., I/O submission queues and I/O completion queues) may be created in system memory associated with a co-host (e.g., BAR memory). According to some embodiments, a host may create queues and may provide memory allocation details to a co-host. According to one or more embodiments, a co-host determine memory allocation information and provide the memory allocation information to a host.

At stage 412 a storage command may be submitted from a co-host to a co-host I/O submission queue. Such a submission may occur entirely without host involvement and may reduce traffic above a PCI Express switch and Host CPU utilization.

At stage 414, a ring doorbell command may be issued by a co-host to an allocated memory space of a target device. The allocated memory space of a doorbell on a target device may have been provided in advance to the co-host by the host.

At stage 416, it may be determined whether queues are on a host or a co-host. In some embodiments, queues may be allocated on a separate PCIe device. If queues are located on a host the method 400 may continue at stage 418. If queues are located on a co-host the method 400 may continue at stage 420.

At stage 418 a fetch command may be sent from a target device to a PCI express switch and forwarded to a host.

At stage 420 a fetch command may be sent from a target device to a PCI express switch and forwarded to a co-host.

At stage 424, it may be determined whether Physical Region Pages (PRPs) or scatter gather lists exist in a data buffer on a host or in a data buffer in memory of a co-host. If PRPs or scatter gather lists exist in a data buffer on a host the method may continue at stage 428. If PRPs or scatter gather lists exist in a data buffer on a co-host the method may continue at stage 426.

At stage 426 data may be transferred between a co-host and a target device using a data buffer of a co-host.

At stage 428 data may be transferred between a co-host and a target device using a data buffer of a host.

At stage 430, the method 400 may end.

Figure 5:
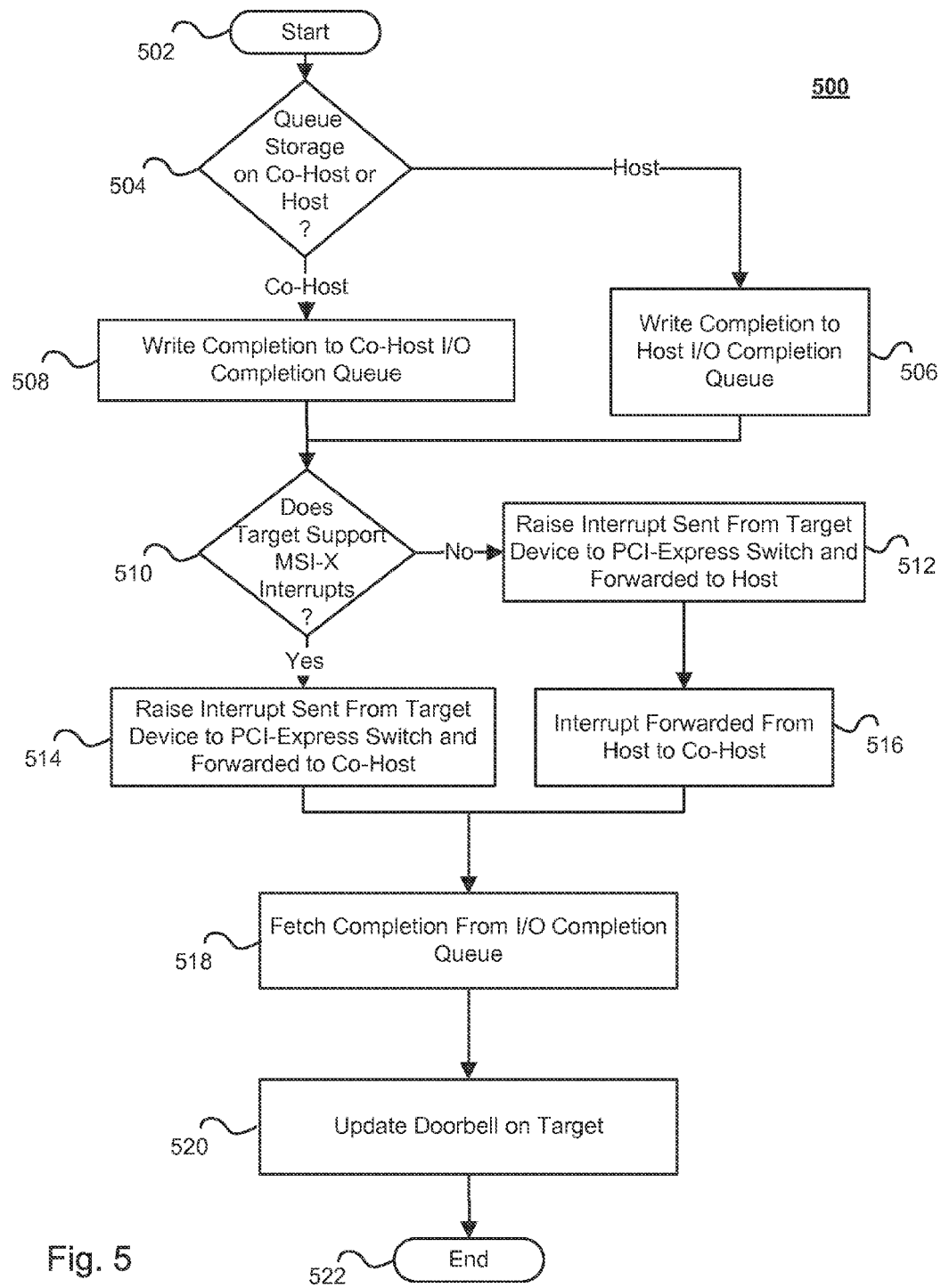
FIG. 5 depicts a flowchart illustrating peer-to-peer PCIe storage transfers, in accordance with an embodiment of the present disclosure.

FIG. 5 depicts a flowchart illustrating peer-to-peer PCIe storage transfers, in accordance with an embodiment of the present disclosure. The process 500, however, is exemplary. The process 500 can be altered, e.g., by having stages added, changed, removed, or rearranged. At stage 502, the process 500 may start.

At stage 504, it may be determined whether queues are on a host or a co-host. In some embodiments, queues may be allocated on a separate PCIe device. If queues are located on a host the method 500 may continue at stage 506. If queues are located on a co-host the method 500 may continue at stage 508. If queues are located on a host, at stage 506 an indication of completion may be written to a host I/O completion queue. If queues are located on a co-host, at stage 508, an indication of completion may be written to a co-host I/O completion queue.

At stage 510, it may be determined whether a target device supports MSI-X interrupts. If a target device supports MSI-X interrupts, the method 500 may continue at stage 514. If a target device does not support MSI-X interrupts, the method 500 may continue at stage 512.

At stage 512, an interrupt that is not MSI-X compliant (e.g., (polled, INTX or MSI interrupts) may be sent from a target device to a PCI express switch and forwarded to a host.

At stage 516 the host may forward the interrupt to the co-host.

At stage 514, a target supporting MSI-X interrupts may forward an interrupt via a PCI express switch to a co-host. Since the address of the interrupt is also within the co-host's BAR space, the Memory Write will be routed directly to the co-host by PCI express switch, rather than to host.

At stage 518 the completion may be fetched by the co-host from the I/O completion queue.

At stage 520 the co-host may update the doorbell on the target. At stage 522, process 500 may end.

FIG. 6 depicts a table of exemplary parameters for communicating device capabilities between a host and a co-host, in accordance with an embodiment of the present disclosure. As depicted in FIG. 6, one or more parameters may be communicated between a co-host and a host to negotiate queue creation. Queue creation parameters may include, for example, parameters which set a size for queue entries or a maximum size for data transfers. Parameters may also provide information about a maximum number of queue entries, a host system memory page size, or other configuration information.

FIG. 7 depicts a table of exemplary completion queue parameters, in accordance with an embodiment of the present disclosure. As illustrated in FIG. 7, one or more delegated completion queue parameters may be communicated (e.g., from a host to a co-host) to indicate, for example, completion queue size, memory address, interrupt address, and other queue metadata.

FIG. 8 depicts a table of exemplary submission queue parameters, in accordance with an embodiment of the present disclosure. As depicted in FIG. 8 one or more submission queue parameters may be provided including, for example, memory address of a submission queue, queue size, priority, and other queue metadata.

FIG. 9 depicts a table of exemplary completion queue creation parameters, in accordance with an embodiment of the present disclosure. After negotiating queue creation parameters between Host and Co-Host, standard NVMe commands may be sent by a Host (e.g., owner of the Target's Admin Queues) to a Target to create one or more delegated queues on behalf of the Co-Host. Exemplary command parameters are presented in FIG. 9.

FIG. 10 depicts a table of exemplary submission queue creation parameters, in accordance with an embodiment of the present disclosure. After negotiating queue creation parameters about the between Host and Co-Host, standard NVMe commands may be sent by a Host (e.g., owner of the Target's Admin Queues) to a Target to create one or more delegated queues on behalf of the Co-Host. Exemplary command parameters are presented in FIG. 10.

FIG. 11 depicts a table of exemplary interrupt vector configuration parameters, in accordance with an embodiment of the present disclosure. Depicted in FIG. 11 is an exemplary entry in a Target's standard MSI-X table, identified by the Delegated IV Number in the Create I/O Completion Queue command. The Target can use these interrupt parameters to route its MSI-X interrupt response, and the Host can configure them shown, such that the response can be routed directly to the Co-Host Other embodiments are within the scope and spirit of the invention. For example, the functionality described above can be implemented using software, hardware, firmware, hardwiring, or combinations of any of these. One or more computer processors operating in accordance with instructions may implement the functions associated with peer-to-peer PCIe storage transfers in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for providing peer-to-peer storage transfers between Peripheral Component Interconnect Express (PCIe) devices comprising:

providing, in memory of a first PCIe device, a number of queues for data communicated between the first PCIe device and a target PCIe device, wherein the number of queues to utilize on the first PCIe device and a number of queues to utilize on a host device is based on one or more factors including: an amount of memory available on the first PCIe device, an amount of memory available on the host device, a utilization level of the host device, a utilization level of the first PCIe device, an amount of bandwidth available between a Peripheral Component Interconnect Express (PCIe) switch and the host device, and an amount of bandwidth available between the Peripheral Component Interconnect Express (PCIe) switch and the first PCIe device;

receiving, at the first PCIe device, queue memory allocation information transmitted from the host device communicatively coupled to the first PCIe device and the target PCIe device; and generating, using a computer processor of the first PCIe device, a storage command.

2. The method of claim 1, wherein the peer-to-peer storage transfers include storage transfers to or from an Non-Volatile Memory express (NVMe) compliant target device.

3. The method of claim 2, wherein a queue of the number of queues for data communicated between the first PCIe device and a target PCIe device is assigned to a Peripheral Component Interconnect Express (PCIe) memory region assigned by a PCIe enumerator at initialization time of the first PCIe device.

4. The method of claim 1, wherein a queue of the number of queues for data communicated between the first PCIe device and a target PCIe device comprises an I/O (Input/Output) submission queue for communication of a storage command to the target PCIe device.

5. The method of claim 1, wherein a queue of the number of queues for data communicated for data communicated between the first PCIe device and a target PCIe device comprises an I/O (Input/Output) completion queue for receiving an indication of storage command completion from the target PCIe device.

6. The method of claim 1, further comprising:
providing, in memory of the first PCIe device, a first and second queue for data communicated between the first PCIe device and the target PCIe device; and
receiving, at the first PCIe device, queue memory allocation information from the host device for the first and second queues.

7. The method of claim 5, wherein a second queue of the number of queues for data communicated between the first PCIe device and a target PCIe device comprises at least one of: an I/O (Input/Output) submission queue for communication of a storage command to the target PCIe device and an I/O (Input/Output) completion queue for receiving an indication of storage command completion from the target PCIe device.

8. The method of claim 1, further comprising:
providing, in memory of the first PCIe device, a data buffer.

9. The method of claim 1, wherein a queue is provided in memory of the host device for at least one of: admin submission, admin completion, I/O submission, and I/O completion.

10. The method of claim 1, further comprising:
providing, in memory of the host device, a data buffer.

11. The method of claim 1, further comprising:
providing, in memory of a third Peripheral Component Interconnect Express (PCIe) device, a second queue of the number of queues for data communicated between the first PCIe device and the target PCIe device; and
receiving, at the first PCIe device, queue memory allocation information from the host device for the second queue.

12. The method of claim 1, further comprising:
initiating by the first PCIe device a storage transfer command by storing the generated storage transfer command in an I/O submission queue;
issuing a peer-to-peer memory write to a doorbell register of the target PCIe device;
receiving at the first PCIe device a memory read command from the target PCIe device to fetch the storage transfer command; and
transferring data between the first PCIe device and the target PCIe device.

13. The method of claim 1 further comprising:
receiving an indication of completion written by the target PCIe device in an I/O completion queue;
receiving an interrupt from the target PCIe device;
fetching, by the first PCIe device, the completion from the I/O completion queue; and
updating a doorbell of the target PCIe device.

14. The method of claim 13, wherein the target PCIe device is MSI-X (Message Signaled Interrupts eXtended) compliant and the interrupt is sent from the target PCIe device to an address in memory of the first PCIe device.

15. The method of claim 13, wherein the target PCIe device is not MSI-X (Message Signaled Interrupts eXtended) compliant and the interrupt is sent from the target PCIe device to the host and wherein the host relays the interrupt to an address in memory of the first PCIe device.

16. The method of claim 1, wherein the host device comprises at least one of: an enterprise server, a database server, a workstation, and a computer.

17. The method of claim 1, wherein the target PCIe device comprises at least one of: a graphics processing unit, an audio/video capture card, and a Non-Volatile Memory express (NVMe) controller.

18. A computer program product tangibly embodied in a non-transitory computer-readable medium including instructions for providing peer-to-peer storage transfers between Peripheral Component Interconnect Express (PCIe) devices; the computer program product implementing the steps of:
providing, in memory of a first PCIe device, a number of queues for data communicated between the first PCIe device and a target PCIe device, wherein a determination of the number of queues to utilize on the first PCIe device and a number of queues to utilize on a host device is based on one or more factors including: an amount of memory available on the first PCIe device, an amount of memory available on the host device, a utilization level of the host device, a utilization level of the first PCIe device, an amount of bandwidth available between a Peripheral Component Interconnect Express (PCIe) switch and the host device, and an amount of bandwidth available between the Peripheral Component Interconnect Express (PCIe) switch and the first PCIe device;
receiving, at the first PCIe device, queue memory allocation information transmitted from the host device communicatively coupled to the first PCIe device and the target PCIe device; and
generating, using a computer processor of the first PCIe device, a storage command.

19. A system for providing peer-to-peer storage transfers between Peripheral Component Interconnect Express (PCIe) devices, the system comprising:
a first Peripheral Component Interconnect Express (PCIe) device;
a host device configured to determine a number of queues to utilize on the first PCIe device and a number of queues to utilize on the host device, wherein the determination is based on one or more factors including: an amount of memory available on the first PCIe device, an amount of memory available on the host device, a utilization level of the host device, a utilization level of the first PCIe device, an amount of bandwidth available between a Peripheral Component Interconnect Express (PCIe) switch and the host device, and an amount of bandwidth available between the Peripheral Component Interconnect Express (PCIe) switch and the first PCIe device;
a target Peripheral Component Interconnect Express (PCIe) device; and
a Peripheral Component Interconnect Express (PCIe) switch communicatively coupling the first PCIe device, the target PCIe device, and the host;

wherein the first PCIe device includes stored Non-Volatile Memory express (NVMe) command submission instructions stored in memory, the instructions comprising:
an address of a queue in memory of the first PCIe device for I/O submission; and
instructions for generating an NVMe command.

* * * * *